(12) United States Patent
Tsang

(10) Patent No.: US 10,855,111 B2
(45) Date of Patent: Dec. 1, 2020

(54) WIRELESS CHARGING COIL APPARATUS

(71) Applicant: Ming Chung Tsang, Hong Kong (HK)

(72) Inventor: Ming Chung Tsang, Hong Kong (HK)

( * ) Notice: Subject to any disclaimer, the term of this patent is extended or adjusted under 35 U.S.C. 154(b) by 104 days.

(21) Appl. No.: 16/214,008

(22) Filed: Dec. 7, 2018

(65) Prior Publication Data
US 2020/0185963 A1    Jun. 11, 2020

(51) Int. Cl.
*H02J 50/10* (2016.01)
*H01F 1/03* (2006.01)
*H01F 27/28* (2006.01)

(52) U.S. Cl.
CPC ............ *H02J 50/10* (2016.02); *H01F 1/0315* (2013.01); *H01F 27/2804* (2013.01)

(58) Field of Classification Search
CPC ..... H01F 27/2804; H01F 1/0315; H02J 50/10
USPC .......................................... 307/104
See application file for complete search history.

(56) References Cited

U.S. PATENT DOCUMENTS

| 7,259,672 | B2 * | 8/2007 | Takei | .................. G06K 19/067 |
| | | | | 340/572.1 |
| 9,859,052 | B2 | 1/2018 | Kurz et al. | |
| 2013/0181668 | A1 | 7/2013 | Tabata et al. | |
| 2013/0249302 | A1 * | 9/2013 | An | .......................... H02J 50/12 |
| | | | | 307/104 |
| 2013/0293191 | A1 | 11/2013 | Hidaka et al. | |
| 2015/0042440 | A1 * | 2/2015 | Tsurumi | ................. H05K 1/165 |
| | | | | 336/221 |
| 2017/0040105 | A1 | 2/2017 | Peralta et al. | |
| 2017/0104356 | A1 | 4/2017 | Yu et al. | |
| 2019/0304670 | A1 * | 10/2019 | Chiyo | ................... H01F 27/346 |

FOREIGN PATENT DOCUMENTS

WO    2013141653 A1    9/2013

* cited by examiner

*Primary Examiner* — Michael R. Fin

(57) ABSTRACT

A wireless charging coil apparatus is provided. In one embodiment, the apparatus comprises a substrate; a wireless charging coil disposed on said substrate, said wireless charging coil comprising a coil section and a connection terminal; wherein said connection terminal comprises an enlarged end and a connection hole, said enlarged end having an outer width and said connection hole having an inner width, said inner width being less than said outer width, said substrate having an etched portion partially exposing said connection terminal on a bottom side. The apparatus of the present invention reduces the overall thickness thereof, while also maintaining a high operating performance, having good cooling performance and provides a robust connection.

12 Claims, 4 Drawing Sheets

WIRELESS CHARGING COIL APPARATUS

FIELD OF INVENTION

The present invention relates to the field of wireless charging coil apparatuses, in particular relates to a wireless charging coil apparatus with low thickness and high performance.

BACKGROUND OF INVENTION

Wireless charging technology is more and more important to modern day electronic devices. Wireless charging operates by generating a magnetic field in a transmitter coil and converting the magnetic field into electric current in a receiver coil. One of the biggest challenges for a wireless charging apparatus is size constraint. When size and thickness reduce, the maximum current able to flow through the coil is limited. A lot of heat is also generated when the power fed through to the coil increases. The reducing size also increases the chance of faulty connection due to precision limitation of manufacturing equipment. Therefore, an improved wireless charging apparatus having a low thickness while maintaining high operating performance, having a good cooling performance and having a robust connection is desired.

SUMMARY OF INVENTION

In forelight of the above-mentioned problem, a wireless charging coil apparatus is provided. The wireless charging coil apparatus of the present invention allows a safer connection with higher yield, while also reducing the overall thickness of the apparatus. As a result, the apparatus is more reliable and also frees up valuable space for electronic devices.

In an embodiment of the present invention, a wireless charging coil apparatus is provided, comprising: a substrate; a wireless charging coil disposed on said substrate, said wireless charging coil comprising a coil section and a connection terminal; wherein said connection terminal comprises an enlarged end and a connection hole, said enlarged end having an outer width and said connection hole having an inner width, said inner width being less than said outer width, said substrate having an etched portion partially exposing said connection terminal on a bottom side.

In a preferred embodiment, said etched portion exposes a central area of said enlarged end and said connection hole, while a peripheral area of said enlarged end is in contact with said substrate.

In a preferred embodiment, said etched portion comprises a through hole having a width greater than said inner width of said connection hole and less than said outer width of said enlarged end. In another embodiment, the etched portion comprises a slit having a width greater than said inner width of said connection hole and less than said outer width of said enlarged end, said slit extending to an edge of said substrate.

In a preferred embodiment, the wireless charging coil is formed by laser etching. In a further embodiment, a layer of coil material is attached to said substrate before said laser etching to form said wireless charging coil.

In a preferred embodiment, said substrate is a magnetic substrate made of a ferrite material, a nanocrystal material or a combination thereof. In an embodiment, said substrate has a thickness between 0.15-0.35 mm. In another embodiment, an insulating layer is disposed on said wireless charging coil.

By using the wireless charging coil apparatus of the present invention, the connection lead can be connected from the substrate side of the wireless charging coil to external circuitry with minimum or no extra thickness needed, therefore the overall thickness of the apparatus is reduced. The use of nanocrystal/ferrite substrate material and laser etched coil also reduces the thickness of the apparatus while maintaining high operating performance and cooling performance. The connection hole of the wireless charging coil provides a recessed space for the solder material to flow and fill, allowing easier alignment and better yield. The enlarged terminal also allows more solder material to be used and hence providing a more robust connection between the connection lead and the wireless charging coil.

BRIEF DESCRIPTION OF DRAWINGS

FIG. 1b is a bottom view of the embodiment of FIG. 1a.

FIG. 2b is a bottom view of the embodiment of FIG. 2a.

DETAILED DESCRIPTION OF INVENTION

Figure 1A:
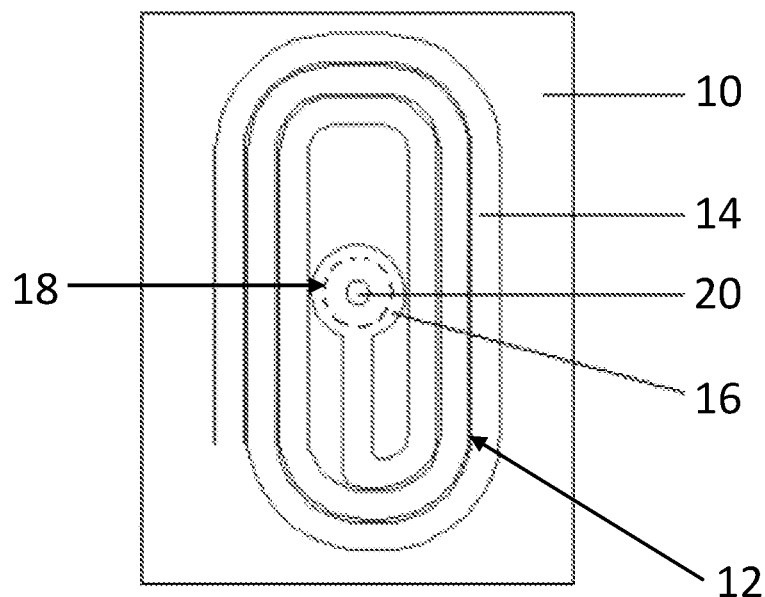
FIG. 1a is a plan view of a first embodiment of the wireless charging coil apparatus of the present invention.
Figure 1B:
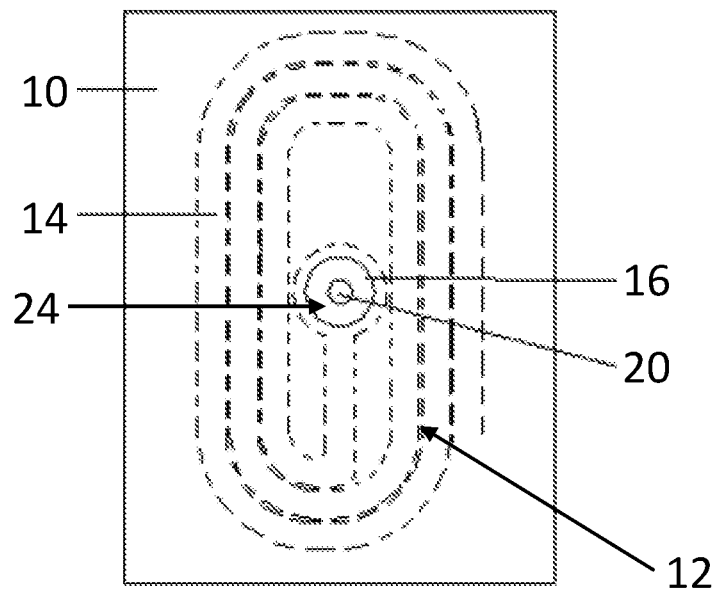
Figure 1C:
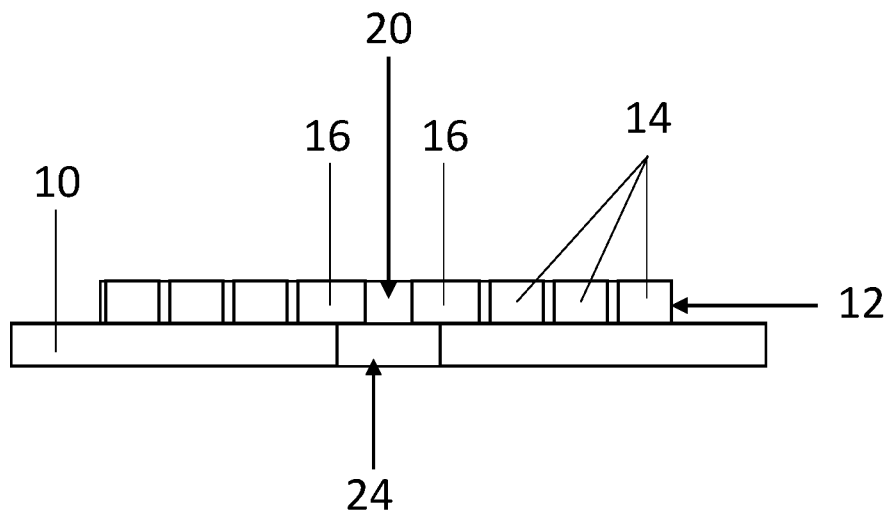
FIG. 1c is a cross sectional view of the embodiment of FIG. 1a along the connection terminal.

FIG. 1 illustrates a plan view of a first embodiment of a wireless charging coil apparatus of the present invention. The wireless charging coil apparatus comprises a substrate 10 and a wireless charging coil 12 disposed on the substrate 10. The substrate 10 is made of a magnetic material and the wireless charging coil 12 is made of an electrically conductive material. When an electric current flows through the wireless charging coil 12, a magnetic field is produced to be received by a wireless receiver coil of a target device in proximity, which is in turn converted to an electric current for charging up the target device. The substrate 10 alters the shape of the magnetic field produced by the wireless charging coil 12 to optimize performance and minimize affect to other electronic components behind the substrate 10.

In a preferred embodiment, the substrate 10 is made from a ferrite material or a nanocrystal material or a combination thereof. The substrate 10 is pre-processed or prepared before use with insulation and other processes as the application requires. In a preferred embodiment, the substrate 10 has a thickness of between 0.15-0.35 mm, and the substrate material is chosen to be suitable for high power and high frequency applications (>100 kHz).

In a preferred embodiment, a sheet of coil material is first disposed on the substrate 10, then the wireless charging coil 12 is formed by laser etching the coil material. In a preferred embodiment, the coil material has a thickness of around 0.1 mm, making the total thickness of the apparatus to be less than 0.45 mm. The high accuracy of laser etching allows a greater number of turns to be packed in a smaller area. Laser etching also provides a sharp vertical edge at the boundaries of the etched areas, which in turn provides a greater rectangular cross section area of the wireless charging coil 12 comparing with wound coils having a round cross sectional shape. The greater cross section area increases the amount of current that can flow into the wireless charging coil 12, and hence the strength of the magnetic field generated is also increased. The wireless charging coil 12 can also be formed by chemical etching or other known means. The wireless charging coil 12 directly contacting the substrate 10 allows the substrate 10 to act as a heat sink for the coil, thereby provides improved cooling performance of the apparatus, and alleviates overheating issues generally associated to high power wireless charging coil apparatuses.

Returning to FIG. 1, the wireless charging coil 12 comprises a coil section 14 and a connection terminal 16. The coil section 14 comprises a number of turns formed around a central area, where the magnetic field strength is the strongest. The shape and number of turns, the number of filars of each turn, the width of the gap between turns, and the coil width or filar width etc. are all decided in the etching step to fulfill design requirements. The turn shape of the wireless charging coil 12 can be round, rectangular or in any arbitrary shape as defined by the substrate 10. The coil width can be uniform throughout the length of the coil section 14, or it can vary along different locations on the substrate. The coil section 14 can have a single filar or can be bifilar etc., with the filars connected at the connection terminal 16.

The connection terminal 16 is disposed within the central area for electrically connecting with external circuitry. The connection terminal 16 comprises an enlarged end 18 having an outer width greater than a coil width of the coil section 14. In a preferred embodiment, the enlarged end 18 is as large as possible, as long as the enlarged end 18 does not touch the most inner turn of the coil section 14, which defines the boundary of the central area. The connection terminal 16 also comprises a connection hole 20 disposed within the enlarged end 18, the connection hole 20 having an inner width smaller than the outer width. The inner width of the connection hole 20 can be larger or smaller than the coil width of the coil section 14. In the current embodiment, the enlarged end 18 and the connection hole 20 are both shown as round, but it is understood that both can assume other shapes as desired.

The substrate 10 comprises an etched portion 22 opened on the substrate 10. The etched portion 22 has an area that coincides with the connection hole 20 and partially coincides with the enlarged end 18, thereby exposing the connection hole 20 from a bottom side but remains partly attached to the enlarged end 18. In the present embodiment, the bottom side of the wireless charging coil 12 faces a top side of the substrate 10, and the bottom side of the wireless charging coil 12 is sometimes referred as the substrate side. The etched portion 22 can be made using laser etching or other etching techniques.

In the embodiment of FIG. 1, the etched portion 22 comprises a through hole 24 extending through the entire thickness of the substrate 10. The through hole 24 is coaxially aligned to the connection hole 20 of the connection terminal 16, and has a hole width that is less than the outer width of the enlarged end 18 of the connection terminal 16, but greater than the inner width of the connection hole 20 of the connection terminal 16. As a result, the connection terminal 16 is partially exposed on the substrate side. A peripheral portion of the enlarged end 18 is in contact with the substrate 10, while central areas of the enlarged end 18 and the connection hole 20 is exposed.

Figure 2A:
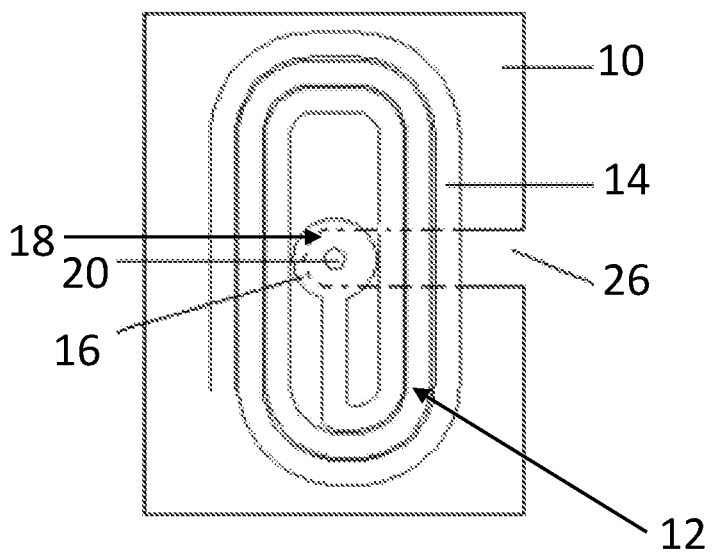
FIG. 2a is a plan view of a second embodiment of the wireless charging coil apparatus of the present invention.
Figure 2B:
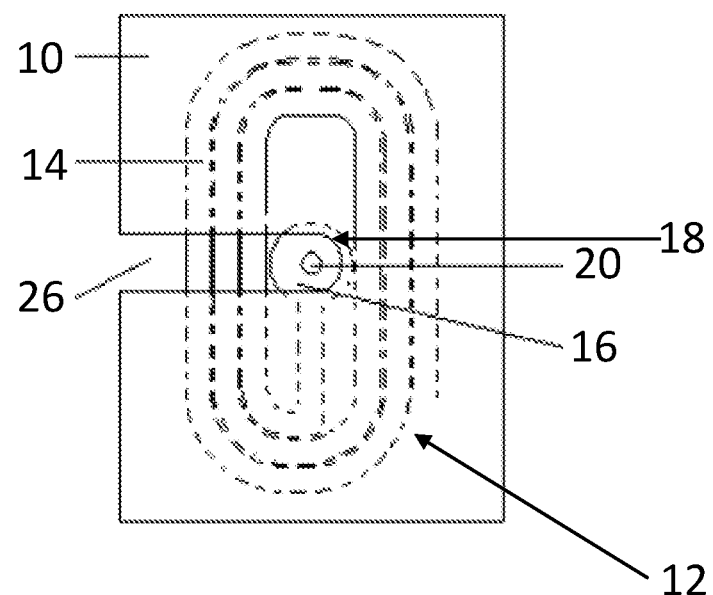
Figure 2C:
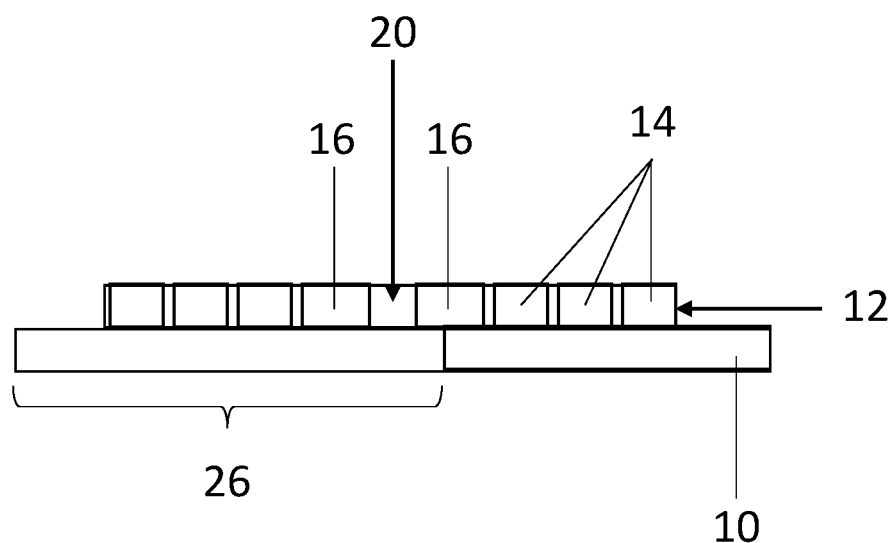
FIG. 2c is a cross sectional view of the embodiment of FIG. 2a along the connection terminal and the slit.

In a second embodiment of the present invention as shown in FIG. 2, the etched portion 22 comprises a slit 26 extending through the entire thickness of the substrate 10, and extending from the connection terminal 16 to an edge of the substrate 10. The slit 26 has a slit width that is less than the outer width of the enlarged end 18 of the connection terminal 16, but greater than the inner width of the connection hole 20 of the connection terminal 16. As a result, the connection terminal 16 is partially exposed on the substrate side. A peripheral portion of the enlarged end 18 is in contact with the substrate 10, while central areas of the enlarged end 18, the connection hole 20 and the areas directly above the slit 26 are exposed.

In a preferred embodiment, the connection hole 20, the through hole 24 and/or the end of the slit 26 are all provided in a round shape. It is obvious that other shapes are also feasible with similar performances and hence this shall not be taken as a limitation. The through hole 24 or the slit 26 can also be provided with a beveled edge with the etched area decreasing towards from the substrate surface to the connection terminal 16.

A connection lead (not shown) is disposed to connect the connection terminal 16 of the apparatus to external circuitry. Since the connection terminal 16 is exposed from the substrate side, the connection leads can be deposited from the substrate side, which reduces the overall thickness of the apparatus, and also prevents the connection lead to affect the magnetic field generated. The connection lead connects to the connection terminal 16 through a solder material. The connection hole 20 forms a recessed area when looked from the substrate side, and the molten solder material will flow into the connection hole 20 before it sets still. In other words, the connection hole 20 provides an alignment mechanism that allows some tolerance from the soldering equipment as the solder material can flow into the connection hole 20. The connection hole 20 also reduces some irregularity of the equipment and provides a more uniform solder shape, improving the reliability of the apparatus. The enlarged end 18 provides a larger contact area along with the connection hole 20, allows more solder material to be used in the connection, providing a more robust connection between the connection terminal 16 and the connection lead. In the first embodiment, the connection lead will be routed beneath the substrate, while in the second embodiment, the connection lead can also be routed along and within the slit until the edge of the substrate 10.

Figure 3:
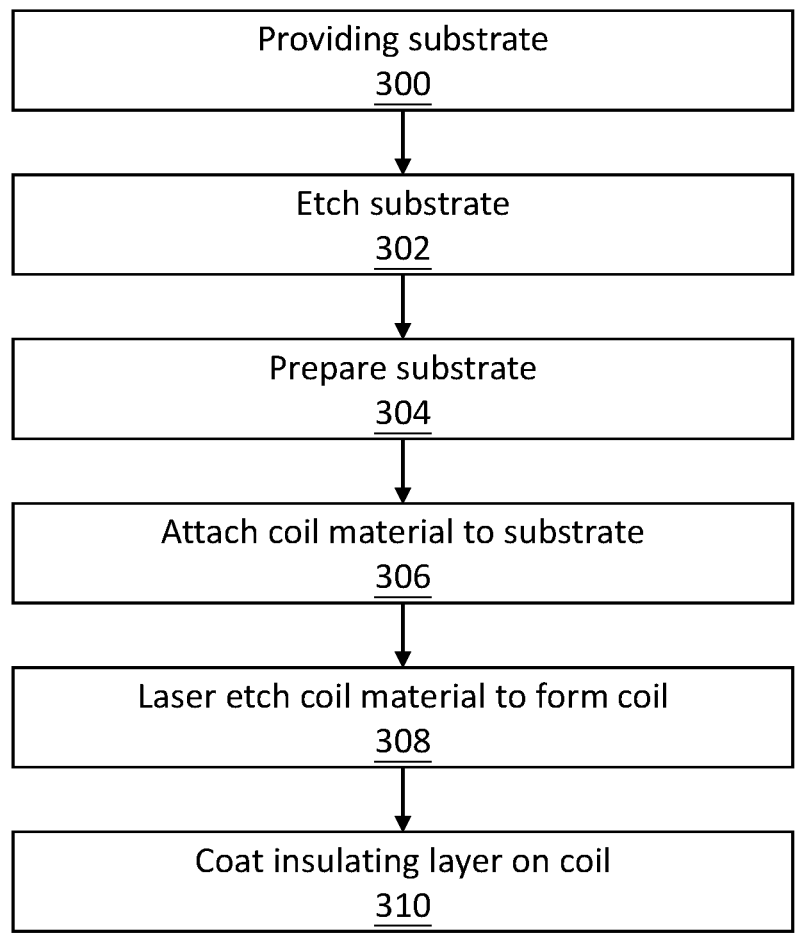
FIG. 3 is a flow chart of manufacturing a wireless charging coil apparatus of the present invention.

FIG. 3 shows a flow chart of manufacturing the wireless charging coil apparatus of the present invention. In step 300, a substrate 10 is provided. In step 302, the substrate 10 is etched to form the etched portion 22. In step 304, the etched substrate 10 is prepared with insulation and other processes. In step 306, a sheet of coil material is adhered or otherwise attached to the substrate 10. In step 308, the coil material is laser etched to form the wireless charging coil 12 including both the coil section 14 and the connection terminal 16. In step 310, an insulating layer is coated onto the top of the wireless charging coil 12. Conventional manufacturing steps such as polishing or rinsing are omitted and can be inserted as necessary. After the above manufacturing steps, connection lead can be soldered to the connection terminal 16 from the substrate side for connection to external components and circuitry.

The exemplary embodiments of the present invention are described above. It is understood that the embodiments are only illustrated for the purpose of explaining the concept of the present invention, and one skilled in the art can make adjustments or alterations within the scope and spirit of the present invention. The scope of protection of the present invention is defined by the claims as set forth below.

What is claimed is:
1. A wireless charging coil apparatus comprising:
a substrate;

a wireless charging coil disposed on said substrate, said wireless charging coil comprising a coil section and a connection terminal;

wherein said connection terminal comprises an enlarged end and a connection hole, said enlarged end having an outer width and said connection hole having an inner width, said inner width being less than said outer width, said substrate having an etched portion partially exposing said connection terminal on a bottom side, wherein said etched portion comprises a through hole having a width greater than said inner width of said connection hole and less than said outer width of said enlarged end.

2. The wireless charging coil apparatus according to claim 1, wherein said etched portion exposes a central area of said enlarged end and said connection hole, while a peripheral area of said enlarged end is in contact with said substrate.

3. The wireless charging coil apparatus of claim 1, wherein said substrate is a magnetic substrate made of a ferrite material, a nanocrystal material or a combination thereof.

4. The wireless charging coil apparatus of claim 1, wherein said substrate has a thickness between 0.15-0.35 mm.

5. The wireless charging coil apparatus of claim 1, wherein said substrate and said wireless charging coil has a combined thickness of less than 0.45 mm.

6. The wireless charging coil apparatus of claim 1, wherein an insulating layer is disposed on said wireless charging coil.

7. A wireless charging coil apparatus comprising:
a substrate;
a wireless charging coil disposed on said substrate, said wireless charging coil comprising a coil section and a connection terminal;

wherein said connection terminal comprises an enlarged end and a connection hole, said enlarged end having an outer width and said connection hole having an inner width, said inner width being less than said outer width, said substrate having an etched portion partially exposing said connection terminal on a bottom side, wherein the etched portion comprises a slit having a width greater than said inner width of said connection hole and less than said outer width of said enlarged end, said slit extending to an edge of said substrate.

8. The wireless charging coil apparatus according to claim 7, wherein said etched portion exposes a central area of said enlarged end and said connection hole, while a peripheral area of said enlarged end is in contact with said substrate.

9. The wireless charging coil apparatus of claim 7, wherein said substrate is a magnetic substrate made of a ferrite material, a nanocrystal material or a combination thereof.

10. The wireless charging coil apparatus of claim 7, wherein said substrate has a thickness between 0.15-0.35 mm.

11. The wireless charging coil apparatus of claim 7, wherein said substrate and said wireless charging coil has a combined thickness of less than 0.45 mm.

12. The wireless charging coil apparatus of claim 7, wherein an insulating layer is disposed on said wireless charging coil.

* * * * *